United States Patent [19]

McMaster et al.

[11] 3,934,970

[45] Jan. 27, 1976

[54] GLASS TEMPERING SYSTEM

[76] Inventors: Harold A. McMaster, 707 Riverside Drive, Woodville, Ohio 43469; Norman C. Nitschke, 9102 Buck Road, Perrysburg, Ohio 43551

[22] Filed: Feb. 19, 1975

[21] Appl. No.: 551,435

[52] U.S. Cl. .................... 432/121; 65/118; 65/119; 65/182 A; 432/244
[51] Int. Cl.² ...................... F27B 9/00; C03B 25/04
[58] Field of Search ...... 432/121, 122, 244; 65/118, 65/119, 182 A

[56] References Cited
UNITED STATES PATENTS

| | | | |
|---|---|---|---|
| 2,232,638 | 2/1941 | Schwalbe | 432/121 |
| 3,665,730 | 5/1972 | Linzer | 65/119 |
| 3,806,312 | 4/1974 | McMaster et al. | 432/121 |
| 3,881,906 | 5/1975 | Ritter, Jr. et al. | 65/118 |

*Primary Examiner*—John J. Camby
*Attorney, Agent, or Firm*—Reising, Ethington, Barnard, Perry and Brooks

[57] ABSTRACT

A glass tempering system including a roller hearth furnace that has a conveyor with elongated rollers extending through an elongated heating chamber of the furnace and outwardly through elongated slots in the sides of the furnace so as to be supported on drive belts which are slidably driven along support surfaces to thereby frictionally drive the rollers and convey glass sheets over the rollers through the heating chamber. The furnace is of a modular construction and includes upper and lower housing portions with inner layers of refractory material that define the heating chamber. Flanges of the refractory material cooperate to define the elongated slots at the sides of the furnace. Heat seal arrangements extend between the refractory flanges and the conveyor rollers to mitigate heat flow from the furnace during use. A first electric motor drive mechanism drives belt sheaves that receive the drive belt at the end of the furnace where glass enters the heating chamber. Vertical support members carry belt sheaves receiving the drive belts at the other end of the furnace and are hydraulically positioned to control the tension of the belts. A secondary conveyor of the system receives the heated glass sheets after leaving the furnace and carries them through quench and cooling units of the system. The secondary conveyor is driven by a second electric motor drive mechanism which is coupled to the first conveyor to tension portions of the furnace conveyor drive belts in a manner that increases the driving force the first drive mechanism can impart to its drive belts. The secondary conveyor includes a pair of continuous drive chains that frictionally drive rollers of this conveyor in a manner similar to the driving of the furnace conveyor rollers. The tension of the secondary conveyor chains is hydraulically controlled.

38 Claims, 15 Drawing Figures

GLASS TEMPERING SYSTEM

BACKGROUND OF THE INVENTION

1. Field of the Invention

This invention relates generally to a roller hearth furnace for heating sheets of glass as the glass is conveyed horizontally through the furnace, and particularly toward such a furnace which is used in a glass tempering system to heat the glass prior to being conveyed through a quench unit where a tempering quench is performed to give the glass desirable mechanical properties.

2. Description of the Prior Art

Glass sheets can be tempered by first heating the sheets and then suddenly cooling them to thereby change the mechanical properties of the glass. The tempering operation increases the strength of the glass and also causes the glass to break into small pieces that are dull and relatively harmless, instead of into large, sharp pieces. To perform the tempering of glass sheets, roller hearth furnaces have been developed in the past to heat the glass sheets prior to their cooling which is usually performed by pressurized air that is sprayed onto the glass. Prior art roller hearth furnaces utilize roller conveyors for conveying the glass sheets through the furnace with their planes oriented horizontally. One such prior art furnace is disclosed by the patent of McMaster et al, U.S. Pat. No. 3,806,312, issued Apr. 23, 1974, and others are shown by the references cited therein. The heated glass is conveyed through a quench unit where the sudden cooling is performed, and cooling units are then used to further cool the glass to a temperature where it can be handled.

SUMMARY OF THE INVENTION

An object of the present invention is to provide a roller hearth furnace for heating glass sheets which are conveyed through the furnace by a conveyor including rollers that extend through a heating chamber of the furnace and outwardly through elongated slots defined at the sides of the furnace by a fixed lower housing portion and a movable upper housing portion, and the ends of the rollers are frictionally supported by continuous drive belts whose movement along support surfaces causes rotation of the rollers to drive glass within the heating chamber along the length of the furnace.

The above object, as well as other objects, features and advantages of the present invention, is carried out by a glass tempering system which includes an elongated furnace of a modular construction having fixed lower housing portions and movable upper housing portions. The housing portions have inner layers of refractory material including outer flanges that define the elongated slots through which the conveyor rollers extend so as to frictionally engage the drive belts externally of the heating chamber. Positioning members locate the rollers longitudinally with respect to the furnace and, when the upper housing portions are located in upper open positions, the positioning members permit the rollers to likewise be moved upwardly and removed from the furnace if roller replacement or repair is necessary or if access to the lower interior of the furnace is required. Heat seal arrangements extend between the refractory flanges of the housing portions and the rollers to mitigate heat flow from the furnace during use. The heat seal arrangements include elongated grooves defined in the refractory flanges and receiving heat seals that oppose each other and have semicircular depressions receiving the rollers. Also, additional heat seals are mounted on outer edges of the refractory flanges outboard from the heat seals received within the grooves so as to further mitigate heat flow from the furnace.

The positioning members for the conveyor rollers are mounted in pairs at opposite ends thereof and include idler rollers that position the conveyor rollers in an antifriction manner. The positioning members associated with sets of adjacent rollers are interconnected and adjusted longitudinally by rotation of threaded members located externally of the furnace heating chamber so as to permit longitudinal "gang" adjustment of the ends of the conveyor rollers with respect to the furnace and thereby insuring that glass travels along a straight path through the heating chamber. The drive belts are tensioned as they slide along support members that define the support surfaces, and the support members are also adjustable by rotation of threaded members to control the vertical position of the rollers and thereby insure that the rollers define a true plane over which the sheets of glass are conveyed. The tension of the belts permits the support members to be discontinuous and still have the belts positioning the rollers at the proper height. The support members are adjustable at both inboard and outboard sides thereof to insure a horizontal orientation of the support surfaces such that the drive belts are fully engaged with the ends of the rollers.

The drive belts have lubricated sides that slide along the support members and dry sides received by driven belt sheaves at the end of the furnace where glass enters the heating chamber. The dry sides of the belts support the conveyor rollers and are also received by idler belt sheaves at the other end of the furnace where heated glass leaves the furnace and is conveyed by a secondary conveyor through a quench unit to provide tempering of the glass. The idler belt sheaves are mounted on vertical support members that are hydraulically positioned to control the tension of the drive belts. A pair of chains drives each of the driven belt sheaves of the furnace conveyor by a first electric motor drive mechanism that incorporates load sharing arrangements so that the two chains driving each driven belt sheave are each tensioned substantially the same amount as the other. The load sharing arrangement for each driven belt sheave includes a plate that is pivotally connected to an output shaft of the primary electric motor drive mechanism and also pivoted to a pair of sprockets that respectively drive the two chains for its associated driven belt sheave. Pivotal movement of the plate with respect to the output shaft equalizes the tensions in the chains so each bears the same load.

The secondary conveyor that carries glass sheets through the quench unit includes a pair of continuous drive chains that frictionally drive rollers of the secondary conveyor in a manner similar to the driving of the rollers of the furnace conveyor. A second electric motor drive mechanism drives the chains of the secondary conveyor and also drives coupling chains that are received by the idler belt sheaves for the drive belts of the furnace conveyor. The coupling chains rotate the idler belt sheaves in a direction that tensions the portions of the furnace drive belts which are not engaged by the furnace conveyor rollers. This tensioning of the furnace drive belts increases the driving force that the driven belt sheaves can impart to the drive belts and thereby cooperates with the load sharing arrangements of the first drive mechanism to permit a large driving force to be supplied to each drive belt.

Each drive chain of the secondary conveyor is trained over a pair of rotatable sheaves or sprockets in a serpentine configuration and one of these sprockets is positioned by a hydraulic unit to control the tension of its associated drive chain.

BRIEF DESCRIPTION OF THE DRAWINGS

An understanding of the present invention will become readily apparent from the following detailed description of the preferred embodiment taken in connection with the accompanying drawings wherein:

FIG. 1, which includes

DETAILED DESCRIPTION OF THE PREFERRED EMBODIMENT

Figure 1A:
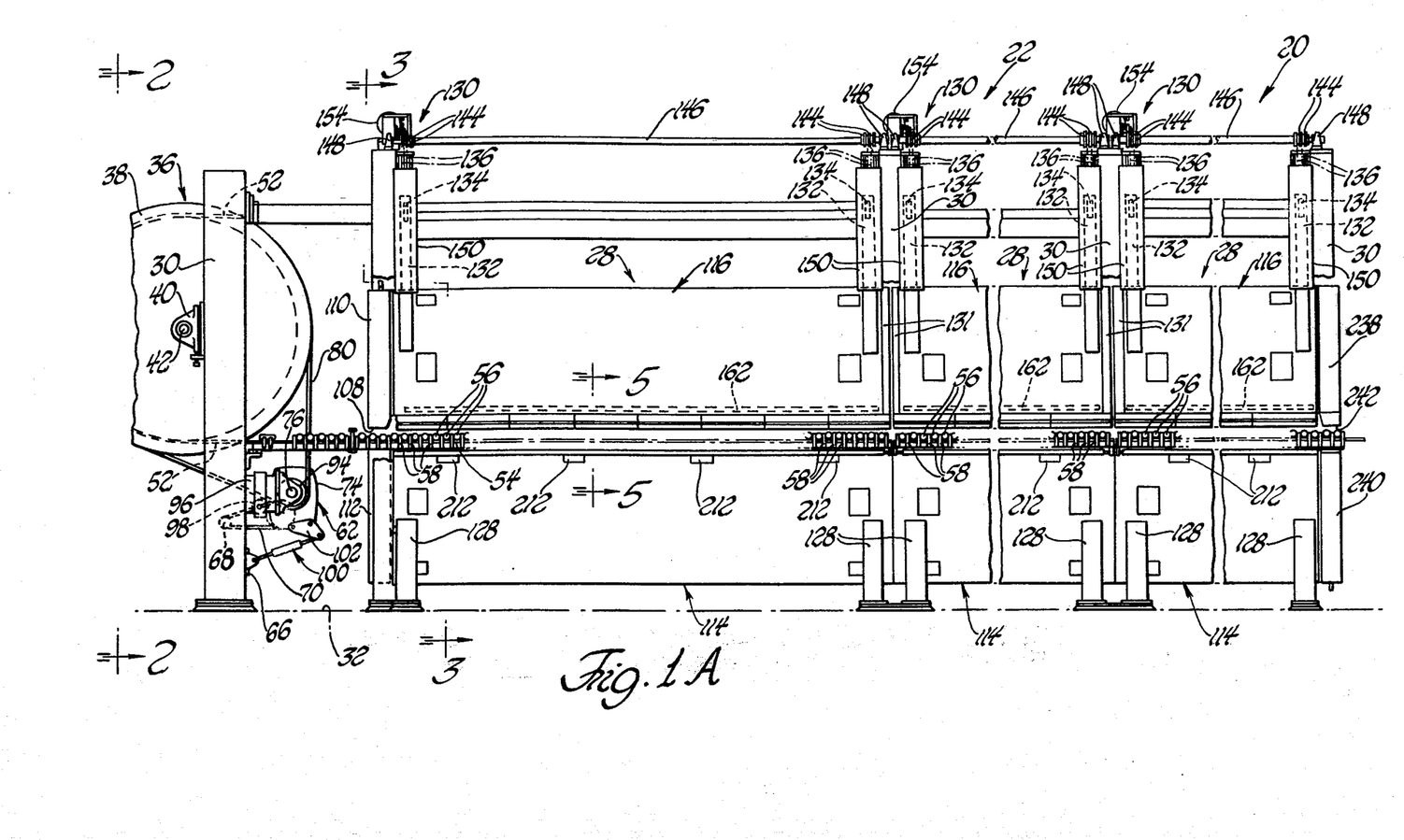
FIGS. 1A and 1B, is a side elevation view of a glass tempering system embodying the invention.
Figure 1B:
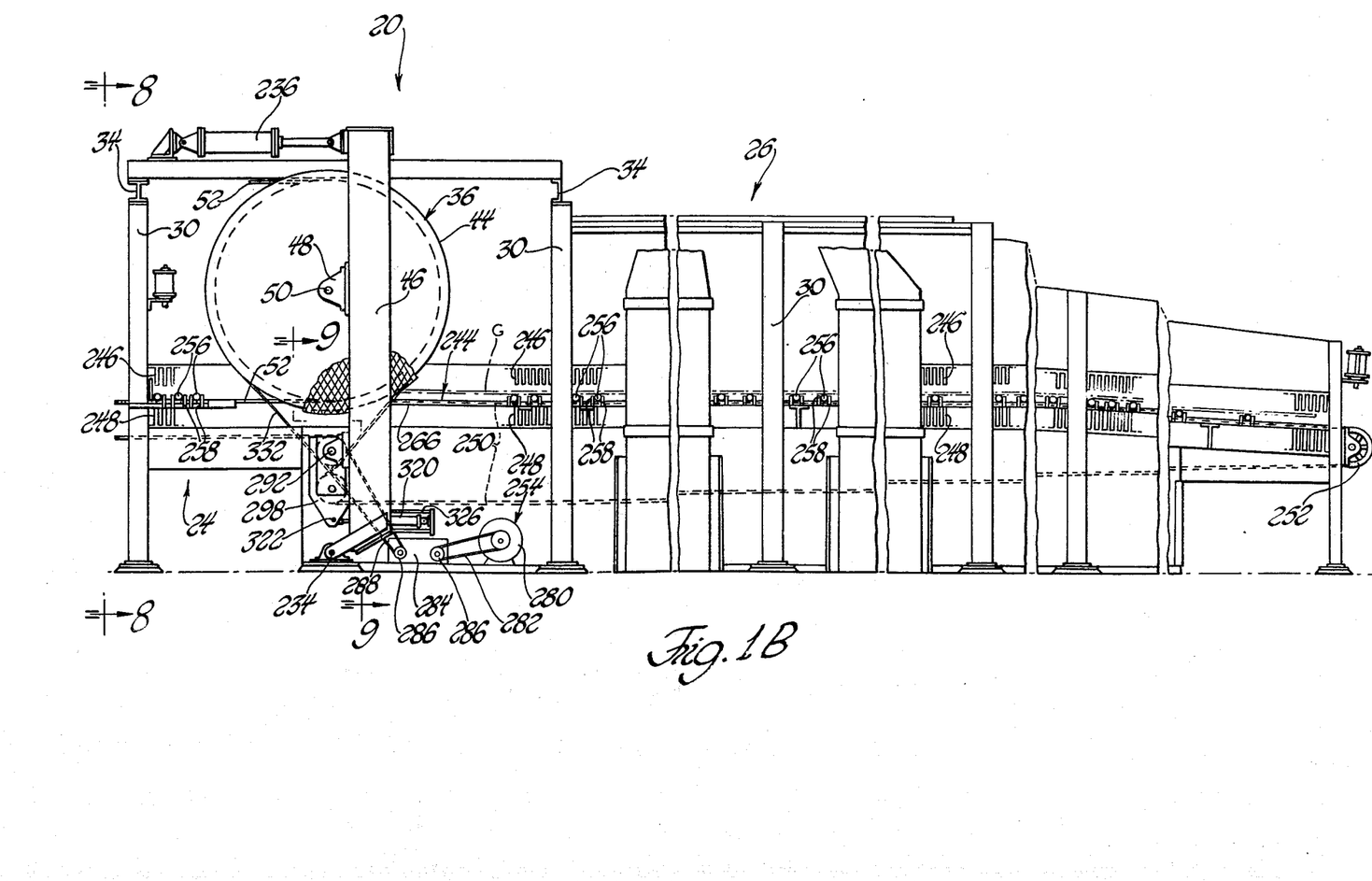

Referring to FIGS. 1A and 1B, a glass tempering system is collectively indicated by reference numeral 20 and includes a roller hearth furnace 22 shown in FIG. 1A, a quench unit shown only partially and indicated by reference numeral 24 in FIG. 1B, and a cooling unit 26 also shown by FIG. 1B. The glass tempering system 20 heats sheets of glass as they are conveyed through the furnace 22 and then quenches the glass sheets as they are conveyed through the quench unit 24 by spraying pressurized air onto both surfaces of the glass. The glass is then further cooled by pressurized air in cooling unit 26 until it is cool enough to handle. The heating and cooling sequence tempers the glass to improve its mechanical properties.

The roller hearth furnace 22 includes a plurality of elongated furnace modules which are each indicated by reference numeral 28. Ten of the furnace modules are utilized in the preferred embodiment and each has a length of twelve feet; therefore, the furnace has a total length of one hundred twenty feet. A supporting framework for the furnace 22 and the other units of the tempering system includes a plurality of vertical support beams 30 extending upwardly from the floor 32 as well as a number of cross beams 34, see FIG. 3, that provide an upper support structure above each furnace module 28. A conveyor for conveying sheets of glass horizontally through the furnace is indicated collectively by reference numeral 36 and conveys sheets of glass from one furnace module to another moving from the left to the right. At the left-hand end of furnace 22, conveyor 36 includes a pair of driven belt sheaves 38 associated with opposite sides of the furnace and mounted on respective support beams 30 by journals 40 carrying shafts 42. At the right-hand end of furnace 22, the conveyor 36 includes a pair of idler belt sheaves 44 associated with opposite sides of the furnace and mounted on respective vertical support members 46 by journals 48 carrying shafts 50. A pair of continuous steel drive belts 52 are associated with opposite sides of the furnace, and each is received by the driven belt sheaves 38 and the idler belt sheave 44 on its associated side of the furnace. The drive belts 52 have lower runs that slide along support members 54 fixedly mounted along the opposite sides of the furnace. The lower sides of the lower belt runs sliding along the support members 54 are lubricated by an unshown lubricator to mitigate friction, and the other dry sides of the belt are received by the belt sheaves 38 and 44. The upper sides of the lower drive belt runs support a number of rollers 56 that extend through the furnace in a manner which will be subsequently described. Positioning members 58 locate the rollers longitudinally with respect to the furnace so that driven movement of the lower runs of belts 52 frictionally drives the rollers and thereby conveys glass through the furnace 22. The drive belts 52 are driven so that their lower runs move from the right to the left and thereby rotate rollers 56 clockwise such that the glass moves from the left to the right through the furnace.

Figure 2:
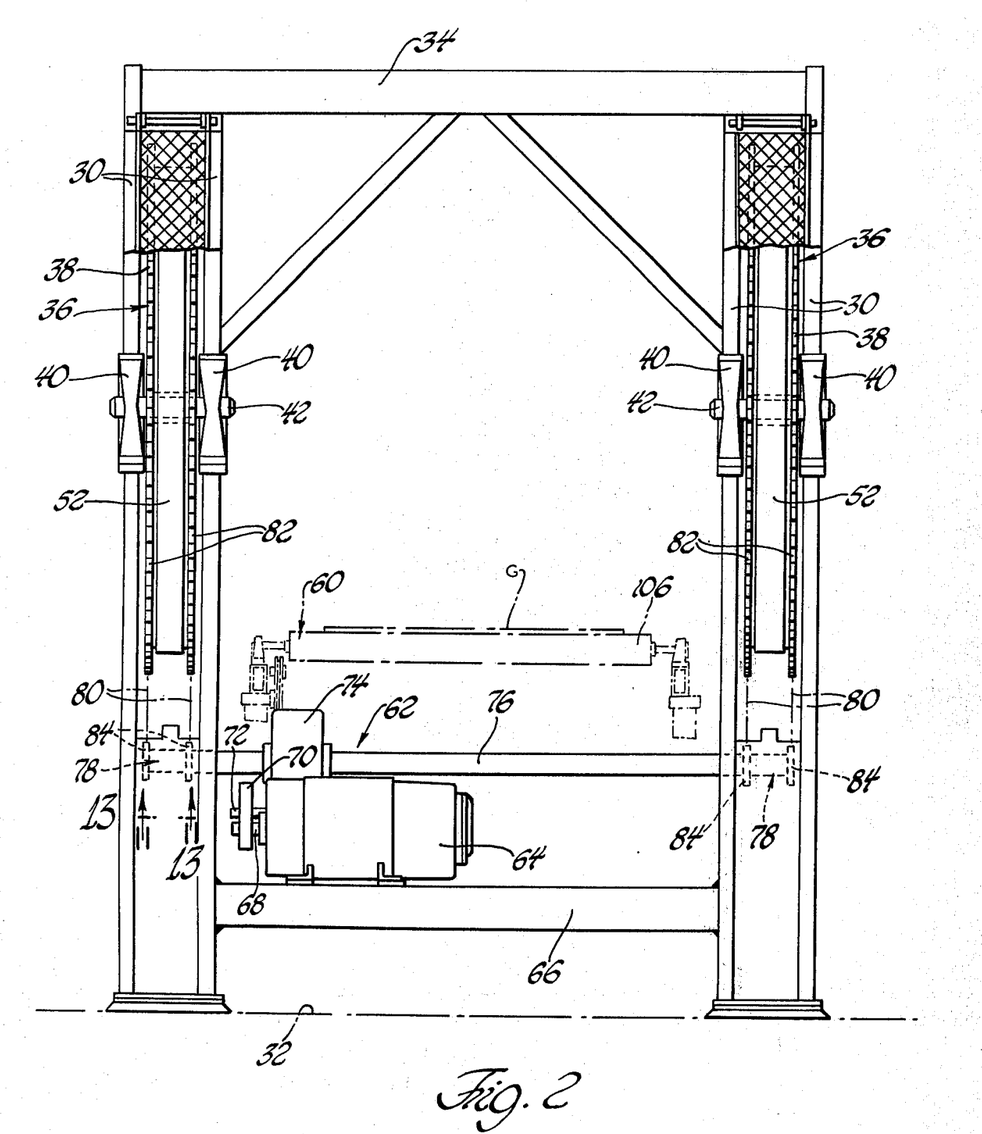
FIG. 2 is an end view taken along line 2—2 of FIG. 1A and shows a drive mechanism used to power a conveyor that carries glass sheets through a furnace of the system.

Referring to FIG. 2, a feeding conveyor shown by phantom lines and indicated by reference numeral 60 feeds sheets of glass G to be tempered to the furnace with the planes of the glass oriented horizontally. Adjacent the feeding conveyor, the furnace conveyor 36 includes a first electric motor drive mechanism collectively indicated by reference numeral 62. Drive mechanism 62 includes a DC electric motor 64 mounted on a lower cross beam 66 extending between the vertical support beams 30. Motor 64 has an output shaft 68 that drives a drive chain 70 to power an input shaft 72 of a speed reducing gear unit 74. An output shaft 76 extends through gear unit 74 and has load sharing arrangements 78 supported on each of its ends in respective alignment with the pair of driven belt sheaves 38 of the furnace conveyor. Each load sharing arrangement drives a pair of continuous drive chains 80 that are respectively received by a pair of toothed sprockets 82 on the belt sheave 38 with which the particular load sharing arrangement is aligned. Each drive belt 52 is received between the toothed sprockets of its belt sheave so that the driving force imparted to the belt sheaves 38 drives the belts 52 in the manner previously described.

Figures 10, 11, 12, 13, 14:
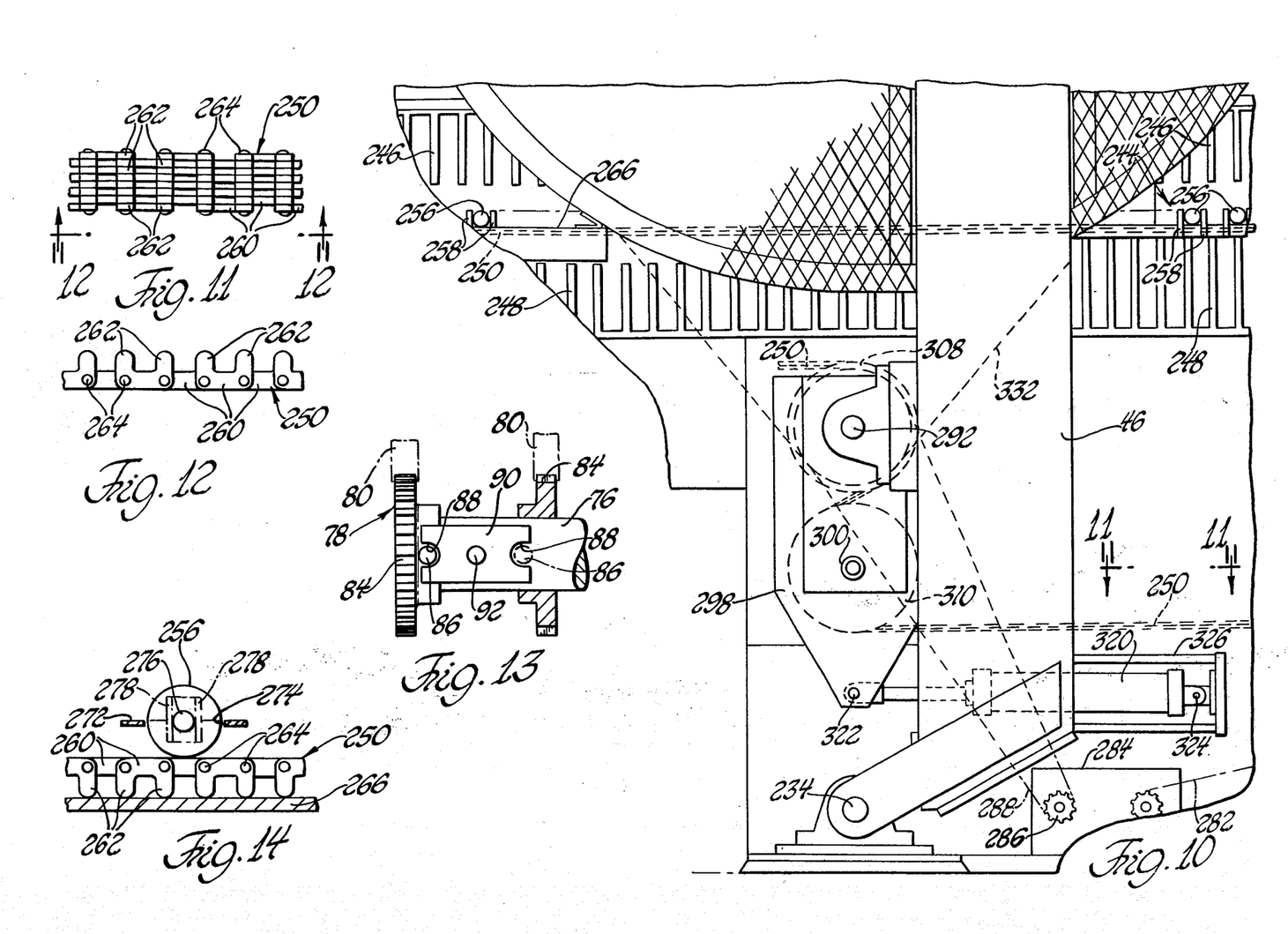
FIG. 10 is a side elevation view of the second electric motor drive mechanism taken along line 10—10 of FIG. 9.
FIG. 11 is an enlarged view taken along line 11—11 of FIG. 10 and shows one of a pair of drive chains of the secondary conveyor.
FIG. 12 is a side view of the secondary drive chain taken along line 12—12 of FIG. 11.
FIG. 13 is a partially sectioned view taken along line 13—13 of FIG. 2 and shows a load sharing arrangement that equalizes tension between two drive chains that drive belt sheaves of the furnace conveyor.
FIG. 14 is a view of a modified roller positioning arrangement for the rollers of the secondary conveyor.

With reference to FIG. 13, each load sharing arrangement 78 includes a pair of toothed sprockets 84 rotatably mounted with respect to the driving shaft 76 and respectively receiving the associated pair of drive chains 80. Each toothed sprocket 84 includes a radially extending pin 86 received within an associated opening 88 in opposite ends of a plate 90. The central portion of plate 90 is pivoted by a pin 92 to the shaft 76 so that the plate 90 rotates with the shaft and thereby drives the toothed sprockets 84 to drive the chains. Pivotal movement of plate 90 about pin 92 ensures that each chain 80 carries the same tension as the other so that each imparts the same driving force to the conveyor.

Figure 4:
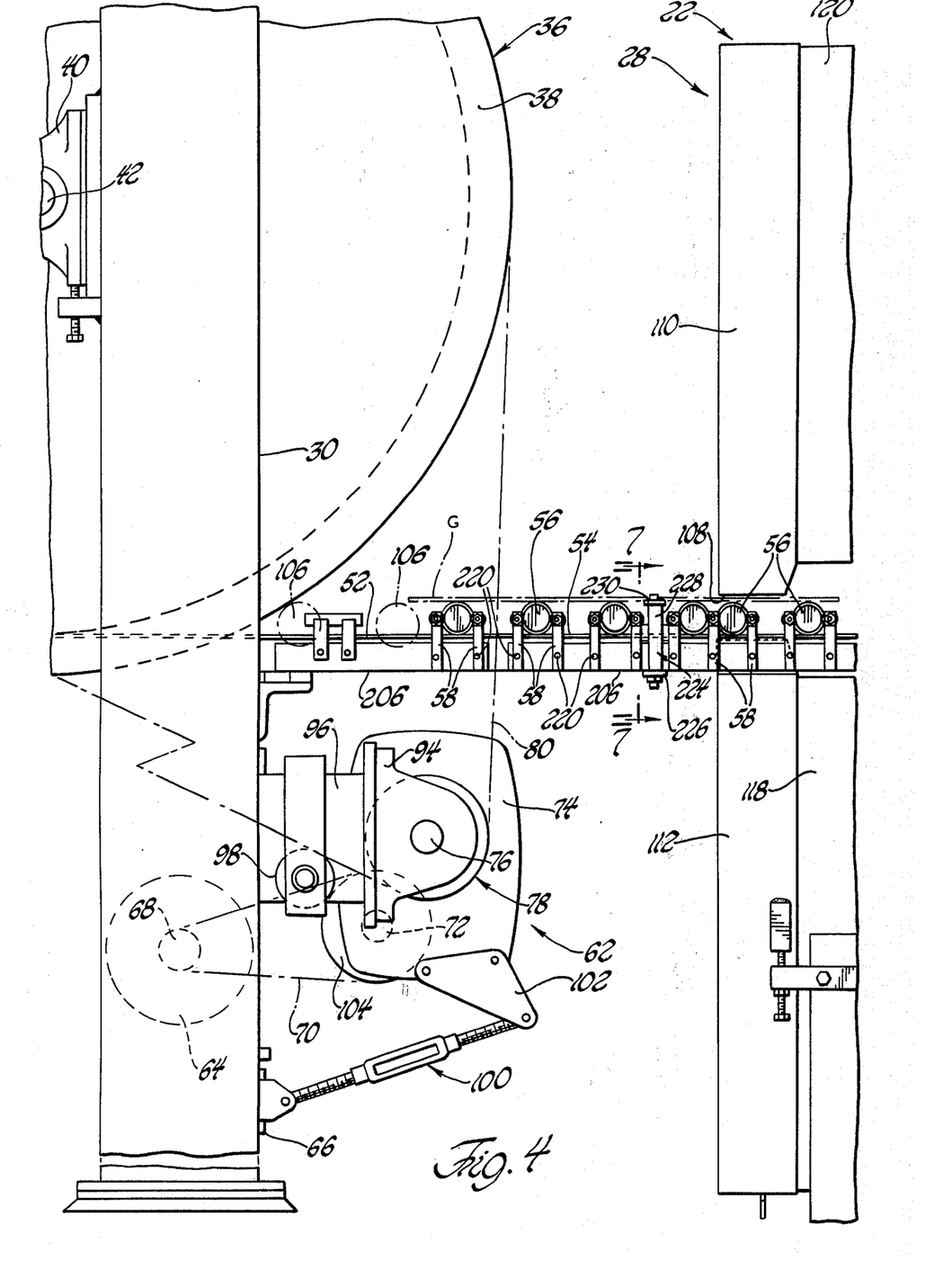
FIG. 4 is an enlarged view of the left-hand portion of FIG. 1A showing the drive mechanism for the furnace conveyor.

With reference to FIG. 4, the output shaft 76 of the speed reducing gear unit 74 is supported at each of its ends by journals 94 mounted on the adjacent vertical support beam 30 by a plate 96. Belt tightening sprockets 98 are mounted on plate 96 in any suitable manner and engage the drive chains 80 to tighten these chains. A turnbuckle 100 is connected to the cross beam 66 extending between the lower ends of the vertical support beams 30 and is also connected to a plate 102 on the gear unit 74. The gear unit 74 is rotatable with respect to the output shaft 76 so that appropriate adjustment of the turnbuckle 100 tightens the chain 70 that extends between the motor shaft 68 and a sprocket 104 carried by the input shaft 72 of the gear unit. The electric motor drive mechanism 62 is located just below rollers 106 of the feeding conveyor 60 where sheets of glass G are transferred to the rollers 56 of the furnace conveyor 36 for conveyance through the furnace 22 through a horizontal opening 108 defined by upper and lower end walls 110 and 112 of the furnace.

Figure 3:
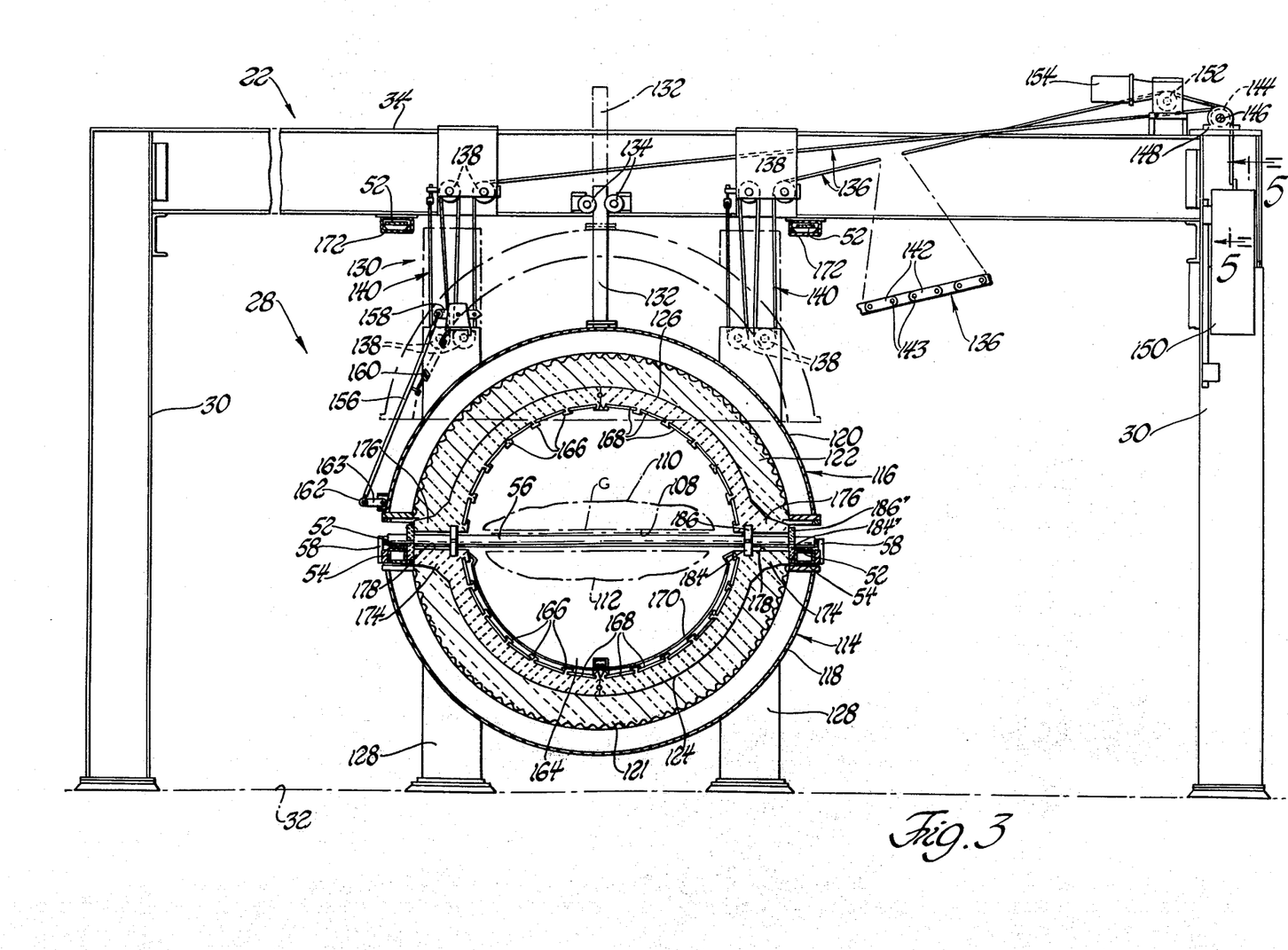
FIG. 3 is an enlarged cross-sectional view of the furnace of the system taken generally along line 3—3 of FIG. 1A.

With reference to FIG. 3, each furnace module 28 includes a semicircular lower housing portion 114 and a complementary semicircular upper housing portion 116. The lower and upper housing portions respectively include outer steel shells 118 and 120, insulating layers 121 and 122 and inner layers 124 and 126 of refractory material. The lower housing portion 114 is mounted on the floor 32 by legs 128 so that its hollow construction opens upwardly toward the upper housing portion. The upper housing portion 116 is suspended at each of its longitudinal ends by a counterbalance mechanism 130 for movement between the lower closed position shown by solid lines immediately over the upper housing portion and an upper raised position shown by phantom lines. The adjacent ends of upper housing portions 116 include semicircular end walls 131, see FIG. 1, that mitigate heat flow from the furnace when one of the upper housing portions is open while adjacent ones thereto are closed. A vertical guide 132 on each end of the upper housing portions is received between a pair of rollers 134 mounted on the cross beam 34 so as to cooperate with the counterbalance mechanism in guiding the upper housing portion between its open and closed positions.

Each counterbalance mechanism 130 includes a pair of support chains 136 extending between sprockets 138 on both the upper housing portion 116 and the cross beam 34 so as to define block and tackle arrangements 140. As seen in the enlarged portion of FIG. 3, the chains 136 each include links 142 connected by pins 143. The support chains 136 extend toward the right from their respective block and tackle arrangements 140 and over sprockets 144 secured to one end of an elongated control shaft 146 that is rotatably supported on the upper end of the adjacent vertical support beam 30 by a journal 148. As seen in FIG. 1A, the control shaft 146 of each furnace module extends longitudinally with respect to the module so that its sprockets 144 coordinate the movements of the support chains 136 at the opposite ends of the module. From the sprockets 144, the two support chains 136 at each end of the module extend downwardly for connection to a common counterweight 150. If one of the support chains 136 breaks, the other can thus carry an additional load so the counterbalance mechanism still functions. One of the four support chains 136 of each furnace module extends over a drive sprocket 152, see FIG. 3, that is driven by an electric motor 154 to move the associated upper housing portion 116 upwardly or downwardly. Each electric motor 154 is controlled by suitable circuitry that is actuated by upward or downward movement of a control rod 156 that actuates a switch arm 158 pivoted to its upper end and to the upper housing portion 116. A helical spring 160 extends between the control rod and the upper housing portion 116 to locate the rod at a neutral position where the motor is de-energized. The lower end of rod 156 is pivoted to an operator handle 162 that is supported on the upper housing portion by pivoting links 163, only one shown. The operator handles 162 are elongated, as seen in FIG. 1A, so an operator can control the positioning of the associated upper housing portions thereof from any location along the longitudinal length of the furnace modules.

Unshown pins on either the upper or lower housing portion are received within unshown V-shaped grooves in the other housing portion to positively support and position the upper housing portion in its lower closed position of FIG. 3. The upper and lower housing portions then cooperatively define an elongated heating chamber 164 which has a round cross-section. Inwardly extending projections 166 of the inner refractory layers 124 and 126 of the housing portions have T-shaped configurations that support heating elements 168 that heat the glass sheets G on both sides thereof as the glass is conveyed through the furnace on top of the rollers 56. The lower housing portion 114 includes a semicircular stainless steel shield 170 that covers its heating elements 168 to protect them from broken glass that may fall downwardly from between the rollers 56. Above the furnace, tubular members 172 are secured to the cross beams 34 and receive upper runs of the drive belts 52 to shield them from the environment.

Figure 5:
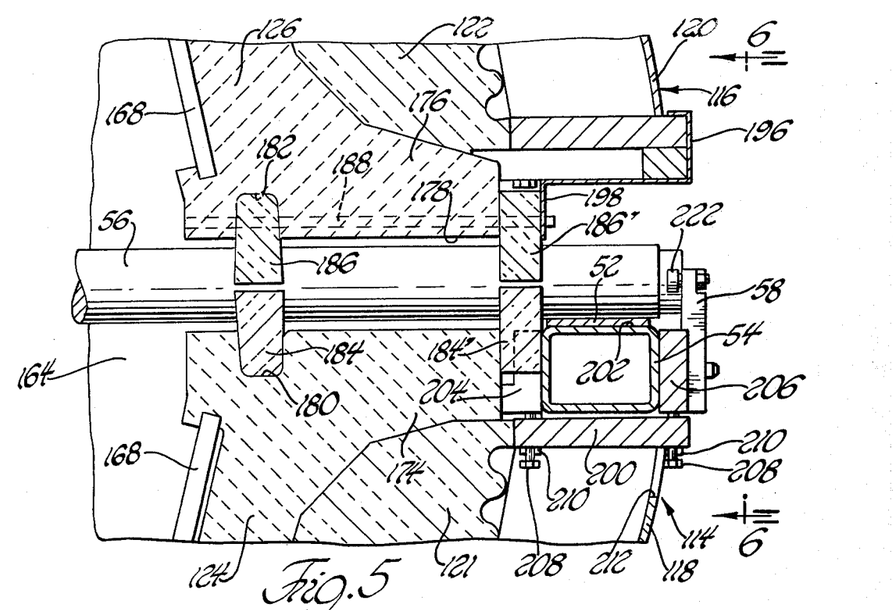
FIG. 5 is an enlarged partial cross-sectional view of the furnace taken along line 5—5 of FIG. 1A.
Figure 6:
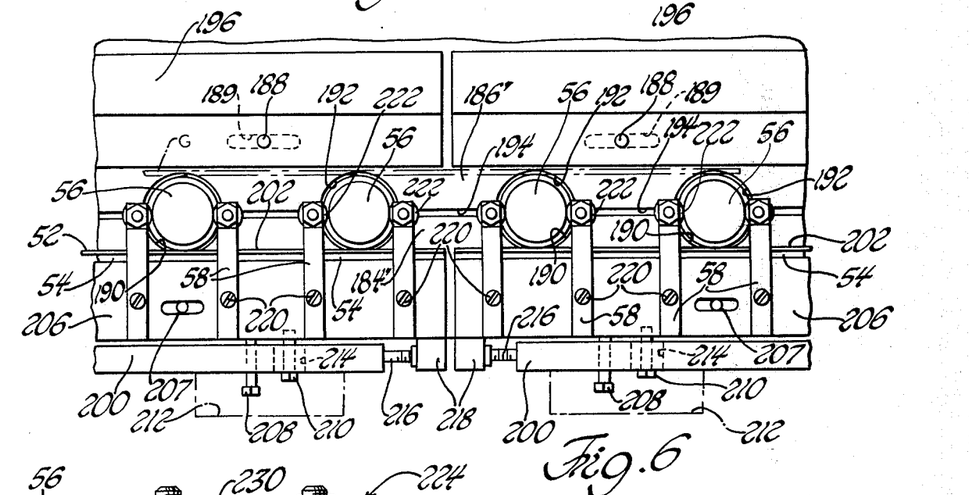
FIG. 6 is a side view of the furnace taken along line 6—6 of FIG. 5.

At each side of the furnace 22 as seen in FIG. 3, the inner layers of refractory material 124 and 126 define a pair of cooperating flanges 174 and 176 that oppose each other and define slots 178 that communicate with the heating chamber 164 of the furnace and open horizontally in a lateral direction in alignment with each other. The slots 178 are each elongated in the longitudinal direction of the furnace and receive the opposite ends of the rollers 56 as the rollers extend outwardly from the furnace heating chamber 164. As seen in FIG. 5, the refractory flanges 174 and 176 define respective grooves 180 and 182 that are elongated parallel to the elongated direction of the slots 178 and receive respective heat seals 184 and 186. Likewise, at the outboard edges of the refractory flanges 174 and 176, additional heat seals 184' and 186' are also provided. A plurality of elongated attachment members 188, only one shown, extend through suitable lateral holes in the upper refractory flange 176 and through elongated slots 189 in the heat seals 186 and 186' to hold them in position against the force of gravity but to permit sliding of these heat seals longitudinally with respect to the furnace. The heat seals oppose each other to seal the elongated slots 178 that receive the opposite ends of rollers 56. As seen in FIG. 6, the lower and upper heat seals respectively include semicircular openings 190 and 192 that receive the rollers so that there is only, at most, a small slot 194 separating the heat seals from each other. The lower heat seals 184 and 184' are preferably made from a castable insulation, while the upper heat seals 186 and 186' are made from a hardened and stamped insulating felt. The heat seals cooperate to provide a heat seal arrangement that mitigates heat flow from the heating chamber 164 of the furnace during use.

With reference to FIGS. 5 and 6, a trim molding 196 is provided along the lower outboard edge of the upper housing portion 116 and includes a flange 198 through which one end of the heat seal attachment member 188 projects so it may be pulled outwardly when replacement of the upper heat seals is necessary. Below the trim molding 196 at each side of the furnace, elongated members 200 are fixedly mounted with respect to the lower housing portion 114 in a suitable manner extending longitudinally with respect to the furnace in a horizontal manner. The elongated members 200 mount the support members 54 whose upper support surfaces 202 slidably support the portions of drive belts 52 which are frictionally engaged by the ends of rollers 56. These engaged portions of the belts 52 are aligned with the slots 178 defined between the refractory flanges 174 and 176 so that the rollers extend in a rectilinear manner between the drive belts 52 on opposite sides of the furnace, and are also at the same vertical height as each other so that the glass sheets conveyed through the furnace have their planes maintained in a horizontal orientation. The support members 54 are shown constructed of a tubular configuration so they may receive coolant fluid that cools the drive belts 52. A rail 204 is fixedly secured in a suitable manner to the inboard side of support member 54, and a rail 206 is slidably secured to its outboard side by pin and elongated slot connections 207.

With further reference to FIGS. 5 and 6, pairs of push and pull bolts 208 and 210 extend upwardly through the elongated members 200 so as to support the rails 204 and 206 and thereby provide adjustability of the vertical height of support surfaces 202 on support members 54 so that the upper sides of rollers 56 can support the glass within the furnace in a true horizontal plane. The tension of drive belts 52 permits the surfaces 202 to be discontinuous and still have the belts locate the rollers at the proper elevation. Also, the bolts 208 and 210 are located at both inboard and outboard locations so as to insure a true horizontal orientation of the support surfaces 202 and thereby provide full engagement between the drive belts 52 and the ends of the rollers 56. The inboard pairs of bolts are accessible through apertures 212 in the outer shell 118 of the lower housing portion so they can be rotated by a conventional wrench. The push bolts 208 extend through threaded apertures in the elongated members 200 and have their upper ends engaged with their associated rail 204 or 206 to provide a positive upward movement of the rails as the push bolts are threaded upwardly. The pull bolts 210 extend upwardly through elongated slots 214 in the elongated members 200 and are threaded into their associated rails so that appropriate rotation of the pull bolts provides a positive downward movement of the rails and of the support surfaces 202 on which the drive belts 52 are slidably driven. The elongated slots 214 are necessary so that the pull bolts can slide longitudinally with respect to the furnace upon adjustment of threaded bolts 216 extending between the ends of the elongated members 200 and downward projections 218 at the ends of the rails 206. Adjustment of the bolts 216 thus moves the outboard rails 206 longitudinally with respect to the support members 54, as the pin and slots of connections 207 slide with respect to each other, and thereby controls the longitudinal position of the roller positioning members 58 which are secured to the outboard rails by bolts 220. The longitudinal movement of the positioning members 58 adjustably locates the ends of the rollers 56 in a "gang" fashion so the rollers carry the glass in a straight line through furnace 22. The longitudinal roller adjustment also slides heat seals 184, 184', 186 and 186' longitudinally due to the receipt of the roller ends within the heat seal depressions 190 and 192. The upper ends of the positioning members 58 rotatably support idler rollers 222 that engage the ends of rollers 56 in an antifriction manner.

Figure 7:
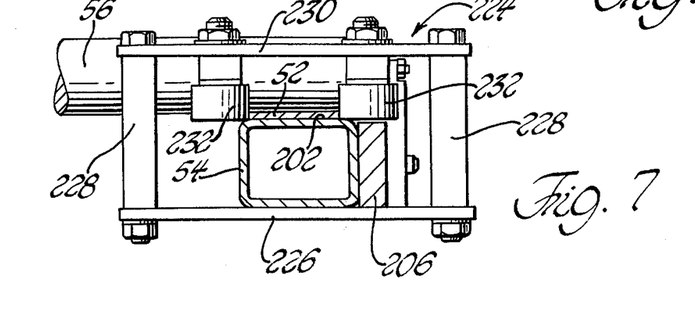
FIG. 7 is an enlarged sectional view through a portion of the furnace taken along line 7—7 of FIG. 4.

As seen by combined reference to FIGS. 4 and 7, just after the lower runs of drive belts 52 leave the furnace 22 and move toward the driven belt sheaves 38, the drive belts pass through guide arrangements 224 to ensure that they are aligned with their associate belt sheaves. Each guide arrangement 224, as seen by particular reference to FIG. 7, includes a lower plate 226 fixedly secured to the lower side of support member 54 and supporting the lower ends of a pair of sleeved nut and bolt arrangements 228 whose upper ends support the opposite ends of an upper plate 230. Upper plate 230 has guide rollers 232 depending downwardly from its lower side and supported for rotation about vertical axes in a spaced relationship with respect to each other so that the edges of the associated drive belt 52 are engaged by the rollers and thereby guided in the proper direction. Also, although it is not shown by the drawings, the upper runs of drive belts 52 are also guided by similar rollers as they move toward the idler belt sheaves 44 at the right-hand end of the furnace so as to be properly aligned with these idler belt sheaves.

The rollers 56 of the furnace conveyor 36 are made of fused silica and have a sufficient width so they will accommodate glass that is 48 inches wide, the roller width being approximately 88 inches in order that the ends of the rollers can project through the sides of the furnace in the manner previously described to be driven by the drive belts 52. The diameter of the rollers is approximately 2½ inches and they are rotated at a rate that drives glass through the furnace usually no faster than approximately 65 feet per minute. Each roller weighs approximately 28 pounds, and there are preferably 24 rollers in each of the first eight furnace modules 28, and 48 rollers in each of the last two modules. Adjacent the exit end of the furnace, the heated glass may tend to sag between the rollers and this is the reason the rollers there are spaced closer together. The driving force for the drive belts 52 must be great enough to overcome the frictional force developed by the substantially large weight of the rollers in order to provide the roller rotation. The load sharing arrangements 78 of the electric motor drive mechanism 62, as previously described, permit each driven belt sheave 38 to be driven by a pair of chains 80 and to thereby transmit the large driving force necessary to drive the conveyor rollers.

The furnace 22 heats sheets of glass to a temperature of approximately 1,300°F and the heat seals for the furnace mitigate heat flow therefrom so that the drive belts do not exceed a temperature of approximately 150°F even with the frictional heat they are subjected to as their lubricated sides slide along their support surfaces. Glass sheets at least as thin as 1/8 of an inch can be conveyed through the furnace with minimum breakage due in part to the precise nature in which the ends of the rollers 56 can be adjusted to provide a true plane over which the glass rides.

With reference to FIG. 1B, the vertical support members 46 that carry the idler drive belt sheaves 44 of the furnace conveyor have lower ends that are pivoted to the floor 32 by pins 234. The upper end of each support member 46 is connected to one end of a hydraulic unit 236 whose other end is connected to the furnace framework. Each hydraulic unit 236 controls the rotational position of its associated vertical support member 46 about the associated pin 234 so as to control the tension of the upper portion of the associated drive belt 52 which is located above the furnace and is not engaged by the rollers. This upper portion or run of the drive belt 52 is commonly referred to as the slack side of the belt and is normally tensioned by hydraulic unit 236 to enable the associated driven belt sheave 38 at the other end of the furnace 22 to impart a driving force to its associated drive belt.

As seen in FIG. 1A, the right-hand end of furnace 22 includes upper and lower end walls 238 and 240 that cooperatively define a horizontal opening 242 through which the sheets of glass are conveyed out of the furnace after being heated. The glass sheets are then transferred to a secondary conveyor 244, FIG. 1B, of tempering system 20 so as to be carried through the quench unit 24 and the cooling unit 26. The quench unit 24 includes upper and lower banks of nozzles 246 and 248 that are fed pressurized air to quench the glass on both of its sides, and the cooling unit 26 likewise includes similar banks of nozzles that lower the temperature of the glass so it can be handled upon being conveyed out the right-hand end of the cooling unit.

The secondary conveyor 244 includes a pair of continuous drive chains 250 respectively associated with opposite sides of the quench and cooling units. At the right-hand end of cooling unit 26, FIG. 1B, the drive chains 250 are received by a pair of associated sprockets 252. Similar sprockets that are not shown are located at the other end of secondary conveyor 244 just to the right of the furnace opening 242 and to the left of the idler belt sheaves 44 of the furnace conveyor. The drive belts 52 of the furnace conveyor and the drive chains 250 of the secondary conveyor are thus overlapped at their adjacent ends intermediate the opposite ends of glass tempering system 20. A second electric motor drive mechanism indicated by reference numeral 254 in FIG. 1B drives the secondary drive chains 250 so that their upper portions move from the right to the left through the quench and cooling units. Upper surfaces of the drive chains 250 support rollers 256 that are located between positioning members 258 so as to be fixed with respect to the elongated direction of glass tempering system 20. Consequently, the frictional engagement between the rollers 256 and the drive chains 250 causes a clockwise rotation of the rollers so as to convey the sheets of glass G to the right.

Figure 8:
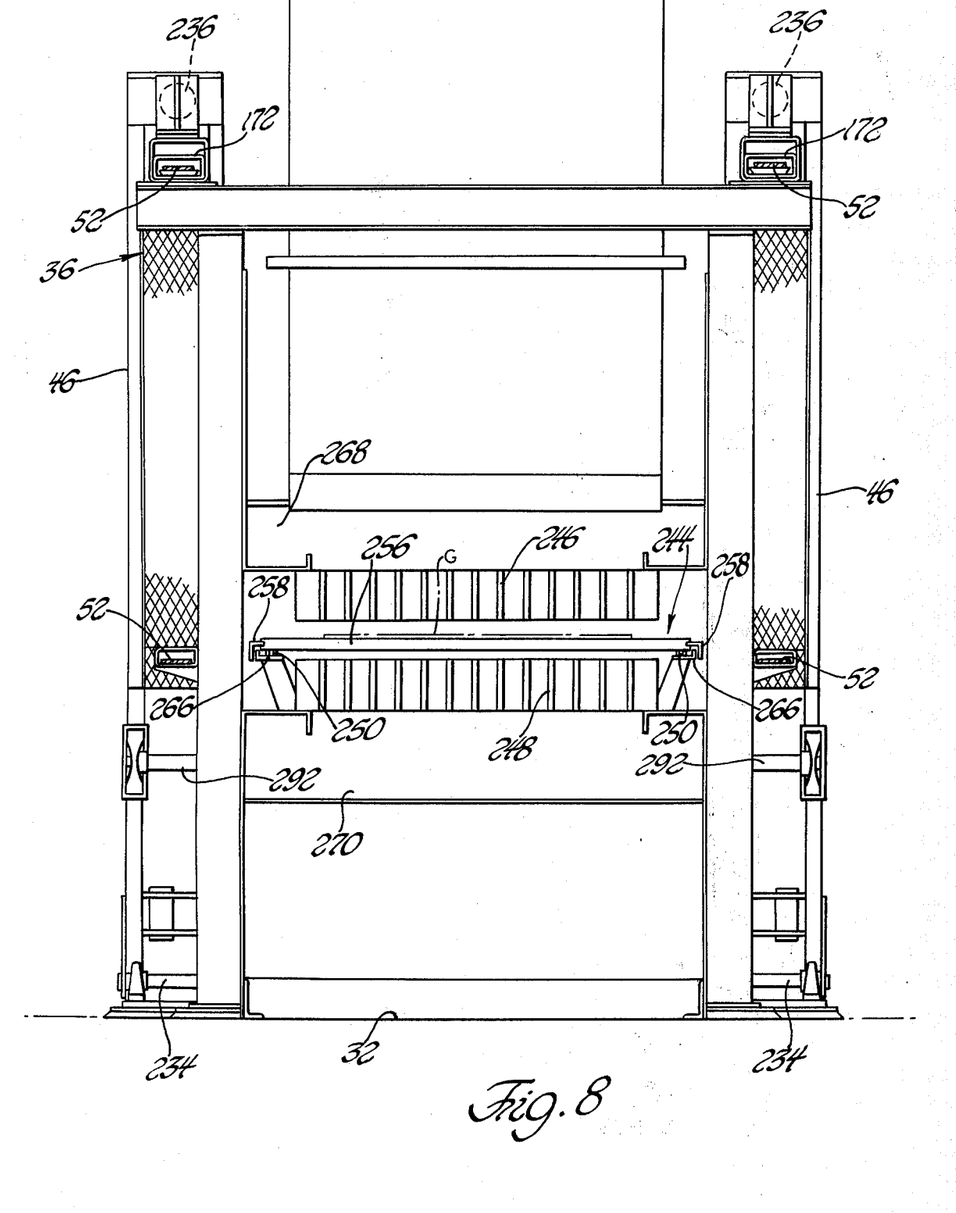
FIG. 8 is a view taken along line 8—8 of FIG. 1B showing a quench unit of the glass tempering system and a secondary conveyor that conveys glass through the quench unit.

FIGS. 11 and 12 show that the secondary drive chains 250 include links 260 having teeth 262 and pins 264 that interconnect the links. The smooth sides of the chains 250 support the rollers 256 and, as seen in FIG. 8, these chains are slidably driven along upwardly facing surfaces of a pair of support members 266 associated with opposite sides of the glass tempering system and extending in a longitudinal direction with respect to the system. The secondary drive chains 250 are located between the furnace drive belts 52 where these drive components overlap adjacent the exit end of the furnace and the entrance end of the quench unit 24. The upper and lower banks of nozzles 246 and 248 are fed pressurized air from respective plenums 268 and 270, which plenums are fed by suitable ductwork, to quench the glass G on both its upper and lower surfaces as it is conveyed over the rollers 256.

The rollers 256 of secondary conveyor 244 may also be located longitudinally with respect to the tempering system by a modified arrangement shown in FIG. 14. This modified arrangement utilizes a shield 272 associated with each of the support members 266 over which the secondary drive chains 250 are slidably driven. The shield 272 defines a plurality of openings 274, only one shown, which receive the rollers 256 so that their lower sides engage the upwardly facing smooth surface of the associated chain 250. A central pin 276 projecting from the end of the roller 256 is received between two vertical positioning flanges 278 of the shield so as to locate the roller longitudinally with respect to the glass tempering system. However, upward movement of the roller for replacement or access to the chain 250 is still possible since the pin 276 can slide vertically between the flanges 278. The spacing between the outer surface of roller 256 and the shield 272 is sufficiently small to prevent glass cullets from moving downwardly between the roller and the shield so as to be wedged between the chain 250 and the roller in a manner that could cause upward vertical movement of the roller and possible damage to glass being conveyed over the roller.

Figure 9:
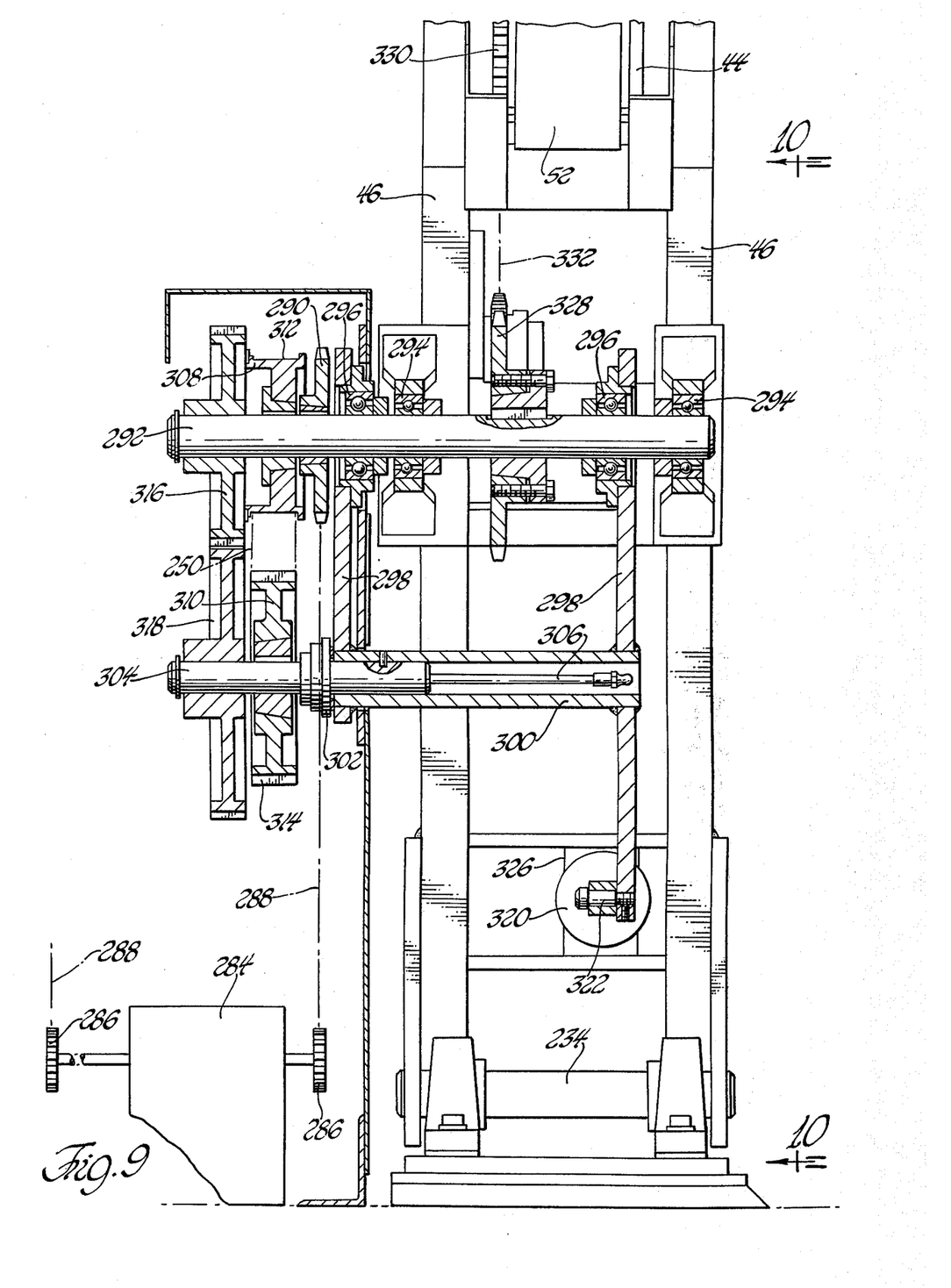
FIG. 9 is a sectional view taken approximately along line 9—9 of FIG. 1B and shows a second electric motor drive mechanism for the secondary conveyor of the system.

With reference to FIG. 1B, the second electric motor drive mechanism 254 includes a DC electric motor 280 that drives a continuous drive chain 282 which drives the input of a speed reducing gear unit 284. With reference to FIG. 9, the output of gear unit 284 drives a pair of sprockets 286 which are respectively associated with the secondary drive chains 250 on each side of the glass tempering system. Each of the secondary drive chains 250 is driven by a drive arrangement like the one shown by FIG. 9 through an associated continuous drive chain 288. Each drive chain 288 extends upwardly to drive a sprocket 290 that is rotatably fixed on a shaft 292. A pair of antifriction bearings 294 rotatably mount shaft 292 on the adjacent vertical support member 46 which also carries the furnace conveyor idler belt sheave 44 associated with the same side of the glass tempering system. A pair of antifriction bearings 296 mounted on shaft 292 rotatably support a pair of plates 298 in a downwardly depending manner. A tubular member 300 is supported by the plates 298 and has a journal 302 that rotatably supports a shaft 304 which is lubricated by an elongated grease fitting 306 extending through the tubular member 300. The shafts 292 and 304 are oriented parallel with each other and carry respective chain sheaves 308 and 310 that receive the associated drive chain 250 in a serpentine configuration as shown by FIG. 10. As previously discussed with respect to FIGS. 11 and 12, the drive chain 250 has a smooth side and a toothed side, and the chain sheave 308 shown in FIG. 9 has an annular groove 312 that receives the smooth side of the chain while the chain sheave 310 has teeth 314 that mesh with the chain teeth to drive the chain. A pair of intermeshed gears 316 and 318 respectively carried by the inboard ends of shafts 292 and 304 provide a path of driving force from the drive chain 288 through the shafts and to the chain sheave 310 to drive the associated drive chain 250.

With reference to FIG. 10, a hydraulic unit 320 has one end connected by a pin 322 to a downward extension on one of the plates 298 that carries the toothed chain sheave 310. The other end of the hydraulic unit is connected by a pin 324 to a U-shaped plate assembly 326 that is carried by the associated vertical support member 46. Hydraulic unit 320 controls the rotational position of plate 298 about its rotational support on shaft 292. The hydraulic unit maintains a properly tensioned condition in the associated secondary drive chain 250 to insure proper functioning of the drive chain. The drive chain 288 extending from the gear unit 284 does not have its tension varied by the hydraulic unit 320 since the sprocket 290 driven by chain 288 is located on the same shaft 292 about which the plate 298 pivots.

With reference to FIG. 9, the shaft 292 driven by drive chain 288 through sprocket 290 also carries a coupling sprocket 328 that is aligned with a toothed sprocket 330 on the adjacent idler belt sheave 44 of the furnace conveyor. A continuous drive chain 332 is received by both sprockets 328 and 330 as also seen in FIG. 1B so as to couple the secondary conveyor 244 with the furnace conveyor 36. The electric motor 280 of the secondary conveyor drive mechanism is sufficiently powerful so that the chain 332 transfers power to the furnace conveyor and tends to rotate its associated idler belt sheave 44 of the furnace conveyor in a clockwise direction. The clockwise rotation transferred to the idler belt sheaves 44 from the secondary conveyor through their associated chains 332 tends to tighten the upper run of belt 52 which is generally referred to as its slack side. The tightening of the slack side of drive belts 52 increases the driving force that the driven belt sheaves 38 at the FIG. 1A left-hand end of furnace 22 can impart to the drive belts. Such an increase in the imparted driving force is necessary due to the large weight of the rollers 56 of the furnace conveyor as previously discussed.

While a preferred embodiment has been described, those skilled in the art will recognize various alternatives that can be used in carrying out the invention as described by the following claims.

What is claimed is:

1. A roller hearth furnace for heating sheets of glass, the furnace comprising:

a horizontally elongated housing including upper and lower housing portions of complementary hollow constructions, the lower housing portion being fixedly mounted in an upwardly opening orientation, the upper housing portion opening downwardly and being mounted for vertical movement between an upper open position spaced above the lower housing portion to permit access into the housing portions and a lower closed position immediately over the lower housing portion so the housing portions cooperatively define a horizontally elongated heating chamber, said housing portions cooperatively defining horizontally elongated slots along the elongated sides thereof, said elongated slots opening horizontally in communication with the heating chamber and in alignment with each other, and means on the housing for heating the chamber thereof; and a roller conveyor for moving sheets of glass through the heating chamber, said conveyor including means defining a pair of support surfaces respectively extending horizontally alongside the slots of the housing and located externally of the heating chamber, said support surfaces being at the same vertical height as each other, a pair of continuous drive belt means respectively slidable on the pair of support surfaces, said drive belt means having upwardly facing surfaces in horizontal alignment with the elongated housing slots and each other while sliding along the support surfaces, a plurality of elongated rollers extending through the heating chamber of the furnace and outwardly through the elongated slots in the housing, the opposite ends of each roller being supported on the upwardly facing surface of the adjacent drive belt means so the roller portions within the heating chamber support sheets of glass in a horizontal orientation, positioning means preventing the rollers from moving in the elongated direction of the furnace so that frictional engagement of the rollers with the drive belt means rotates the rollers as the belt means move along the support surfaces, and drive means for moving the belt means along the support surfaces so glass sheets on top of the rollers within the heating chamber are heated while conveyed within the housing.

2. A furnace according to claim 1 wherein the rollers are freely movable in an upward direction when the upper housing portion is positioned in its upper open position.

3. A furnace according to claim 1 wherein the upper and lower housing portions each carry heat seals that mitigate heat flow from the heating chamber through the elongated housing slots toward the drive belt means.

4. A furnace according to claim 1 wherein each continuous drive belt means takes the form of a steel belt.

5. A furnace according to claim 1 wherein each continuous drive belt means is trained over an associated driven belt sheave at one end of the furnace and an associated idler belt sheave at the other end of the furnace.

6. A furnace according to claim 5 wherein each drive belt means has upper and lower runs with the lower runs having the upwardly facing surfaces supporting the ends of the rollers.

7. A furnace according to claim 1 wherein the drive belt means are driven only in one direction along the support surfaces and thereby convey glass from one end of the furnace to the other in an opposite direction to the direction the belt means are driven along the support surfaces.

8. A furnace according to claim 1 wherein the positioning means for the elongated conveyor rollers includes idler rollers that engage the ends of the conveyor rollers in an antifriction manner.

9. A furnace according to claim 8 wherein each end of each roller is positioned between a pair of the idler rollers.

10. A roller hearth furnace for heating sheets of glass, the furnace comprising:

a horizontally elongated housing including upper and lower housing portions of complementary hollow constructions, the lower housing portion being fixedly mounted in an upwardly opening orientation and having an inner layer of refractory material, the upper housing portion opening downwardly and having an inner layer of refractory material, the upper housing portion being mounted for vertical movement between an upper open position spaced above the lower housing portion to permit access into the housing portions and a lower closed position immediately over the lower housing portion so the inner layers of refractory material of the housing portions cooperatively define an elongated heating chamber of the furnace, said layers of refractory material cooperatively defining a pair of horizontally elongated slots along the elongated sides of the furnace, said elongated slots opening horizontally in communication with the heating chamber and in alignment with each other, and means for heating the heating chamber of the housing;

a roller conveyor for moving sheets of glass through the heating chamber of the furnace from one end thereof to the other, said conveyor including means defining a pair of support surfaces respectively extending horizontally alongside the slots of the housing and located externally of the heating chamber, said support surfaces being at the same vertical height as each other, a pair of continuous drive belts respectively associated with the pair of support surfaces on opposite sides of the furnace, a driven belt sheave for each drive belt at one end of the furnace and an idler belt sheave for each drive belt at the other end of the furnace, said drive belts having portions that are slidably driven along their respective support surfaces and including upwardly facing surfaces in horizontal alignment with the elongated housing slots and with each other, a plurality of elongated rollers extending through the heating chamber and outwardly through the elongated slots in the housing, the opposite ends of each roller being supported on the upwardly facing surface of the adjacent drive belt so the intermediate portions of the roller within the heating chamber support sheets of glass in a horizontal orientation, and a plurality of positioning members extending upwardly between the rollers from adjacent the support surfaces to prevent movement of the rollers along the elongated direction of the furnace so that frictional engagement of the rollers with the belt driven along the support surfaces rotates the rollers and thereby conveys sheets of glass through the furnace, said positioning members permitting upward movement of the rollers when the upper housing portion is in the raised position thereof; and heat seals for sealing between the housing and the rollers at the elongated slots in the housing to mitigate heat flow out of the heating chamber through the slots.

11. A furnace according to claim 10 wherein the inner layers of refractory material of the upper and lower housing portions each define a pair of flanges that respectively cooperate with the flanges of the other housing portion to define the elongated slots through which the rollers extend.

12. A furnace according to claim 11 wherein each flange of refractory material defines an elongated groove extending parallel to the elongated direction of the furnace and receiving an associated heat seal that seals between the rollers of the conveyor and the housing.

13. A furnace according to claim 12 wherein the heat seals of the lower housing portion are made from a castable insulation.

14. A furnace according to claim 12 wherein the heat seals of the upper housing portion are made from a hardened and stamped insulating felt.

15. A furnace according to claim 12 wherein each heat seal of each flange semicircular openings that receive the rollers and thereby cooperate with the heat seal of the adjacent flange in an opposing relationship to mitigate heat flow from the furnace.

16. A furnace according to claim 15 wherein each flange of refractory material on the upper housing portion includes elongated attachment members extending transversely with respect to the furnace through the upper flanges and through the portions of the associated heat seals received within the grooves of the upper flanges.

17. A furnace according to claim 12 wherein additional heat seals are located between the rollers and outboard edge portions of the flanges to further mitigate heat flow from the furnace.

18. A furnace according to claim 10 wherein the upwardly projecting positioning members are interconnected and adjustably supported on the lower housing portion for movement longitudinally with respect to the furnace to simultaneously adjust the position of the adjacent ends of the rollers with respect to the other ends of the rollers so the direction of glass travel is thereby controlled.

19. A furnace according to claim 18 wherein threaded members extend between fixed portions of the lower housing portion and the interconnected positioning members so that rotation of the threaded members moves the positioning members longitudinally with respect to the furnace to adjust the longitudinal position of the ends of the rollers.

20. A furnace according to claim 19 wherein the means of the conveyor for defining the pair of support surfaces over which the drive belts are slidably driven includes support members that are connected to the positioning members for vertical adjustment therewith to ensure the horizontal orientation of the glass as it travels through the furnace.

21. A furnace according to claim 20 wherein threaded members extend between fixed portions of the lower housing portion and the interconnected positioning and support members to provide the vertical adjustment of the rollers.

22. A furnace according to claim 21 wherein the threaded members providing the vertical adjustment are located at both inboard and outboard sides of the interconnected positioning and support members to permit adjustment of the support surfaces defined by the support members in a manner that ensures the horizontal orientation of the support surfaces along a transverse direction with respect to the furnace so that the drive belts are fully engaged with the rollers.

23. A glass tempering system comprising the combination of:

a furnace including an elongated housing defining an elongated heating chamber, heating means for heating said chamber, said housing defining elongated slots at opposite lateral sides of the furnace, said slots communicating with the heating chamber and opening horizontally in alignment with each other;

a first conveyor for moving glass through the furnace from one end thereof to the other, the conveyor including means defining a pair of support surfaces extending horizontally alongside the slots of the housing and located externally of the heating chamber, a pair of continuous drive belt means associated with the pair of support surfaces on opposite sides of the housing, a first pair of belt sheaves rotatably supported on opposite sides of the furnace adjacent the one end thereof and respectively receiving the pair of drive belt means, a second pair of belt sheaves rotatably supported on opposite sides of the furnace adjacent the other end thereof and respectively receiving the pair of drive belt means, a first electric motor drive mechanism for driving the first pair of the drive belt sheaves so that portions of the drive belt means slide along the support surfaces toward the one end of the furnace from the other end thereof, said portions of the pair of drive belt means having upwardly facing horizontal surfaces aligned with the slots in the housing and with each other at the same vertical height, a plurality of elongated rollers extending through the heating chamber and outwardly through the slots in the housing, the opposite ends of each roller being supported on the upwardly facing surface of the adjacent drive belt means so the intermediate portions of the rollers within the heating chamber support sheets of glass in a horizontal orientation, and positioning means locating the rollers longitudinally with respect to the furnace so that frictional engagement of the rollers with the drive belt means rotates the rollers as the drive mechanism drives the first pair of belt sheaves and thereby conveys glass from the one end of the furnace to the other;

a quench unit adjacent the other end of the furnace for quenching the sheets of glass after leaving the furnace;

a second conveyor for carrying the sheets of glass through the quench unit, said second conveyor including means defining a second pair of support surfaces, a second pair of continuous drive belt means, rotatably supported sheaves receiving the second pair of continuous drive belt means so that portions thereof respectively slide over the second pair of support surfaces and define upwardly facing surfaces, a plurality of elongated rollers extending transversely with respect to the elongated direction of the tempering system and having ends respectively supported on the upwardly facing surfaces of the pair of second drive belt means, and positioning means preventing movement of the rollers of the second conveyor longitudinally with respect to the tempering system so that driven movement of the second pair of drive belt means along the support surfaces toward the furnace rotates the rollers supported thereby so as to carry the glass away from the furnace thorugh the quench unit, and a second electric motor drive mechanism for driving the second pair of drive belt means; and means coupling the first and second conveyors to coordinate the movement thereof so that glass moves at a steady state between the two conveyors.

24. A system according to claim 23 wherein the first pair of drive belt means takes the form of a pair of continuous steel drive belts.

25. A system according to claim 24 wherein the second pair of drive belt means takes the form of a pair of continuous drive chains.

26. A system according to claim 25 wherein the coupling means transfers power from the second conveyor to the first conveyor to tension the portions of the first pair of drive belts that are not engaged by the rollers so as to increase the driving force the first pair of belt sheaves can impart to the first pair of drive belts.

27. A system according to claim 26 wherein the coupling means includes a pair of continuous coupling chains respectively trained over the second pair of belt sheaves associated with the drive belts of the first conveyor, the coupling chains being driven by the second electric motor drive mechanism through respective shafts that respectively drive the drive chains of the second conveyor.

28. A system according to claim 26 wherein the second pair of belt sheaves of the first conveyor are rotatably supported on support means that are biased to tension the drive belts received thereby so as to cooperate with the coupling means in tensioning the drive belts of the first conveyor.

29. A system according to claim 28 wherein each of the second pair of belt sheaves for the first conveyor is supported by an associated vertical support member having a lower end pivotally supported and an upper end positioned by a hydraulic unit so as to control the tension of the drive belts.

30. A system according to claim 29 wherein each vertical support member mounts a drive sheave for driving an associated drive chain of the second conveyor.

31. A system according to claim 30 wherein each vertical support member rotatably mounts a pair of sheaves in a spaced relationship on a plate that is pivoted to its support member about the axis of rotation of one of the sheaves carried thereby, the plate being pivotally positioned by a hydraulic unit, and the associated drive chain being received by the pair of sheaves in a serpentine configuration so that movement of the other sheave under the impetus of the associated hydraulic unit controls the tension of the associated chain.

32. A system according to claim 25 wherein shields cover the pair of drive chains of the second conveyor and have openings that receive the roller to permit engagement thereof with the drive chains, the shields preventing glass cullets from moving between the rollers and the drive chains of the second conveyor so as to prevent upward movement of these rollers in a manner that could damage glass being conveyed thereby.

33. A system according to claim 32 wherein the shields include vertical positioning flanges that cooperate with pins on the ends of the rollers of the second conveyor to provide the means for positioning these rollers longitudinally with respect to the tempering system, the positioning flanges permitting upward movement of these rollers for replacement or repair as required.

34. A system according to claim 24 wherein the first pair of belt sheaves are each driven by the first electric motor drive mechanism through an associated pair of drive chains.

35. A system according to claim 34 wherein the two drive chains that cooperate to drive each belt sheave of the first pair of belt sheaves are driven by a load sharing arrangement of the first electric motor drive mechanism to ensure that each drive chain carries a driving force substantially equal to that of the other.

36. A system according to claim 35 wherein each load sharing arrangement includes a plate pivoted to a drive shaft and to a pair of drive sprockets that drive the drive chains.

37. A system according to claim 24 wherein the drive belts of the first conveyor are guided by guide arrangements onto the belt sheaves of the first conveyor.

38. A system according to claim 37 wherein the guide arrangements each include a pair of guide rollers between which the associated drive belt moves so that edge portions of the belt are engaged by the guide rollers to provide the guiding of the belt.

* * * * *